(12) United States Patent
Ganz

(10) Patent No.: US 7,518,512 B2
(45) Date of Patent: Apr. 14, 2009

(54) TRANSPONDER DEVICE

(75) Inventor: Ruediger Ganz, Freising (DE)

(73) Assignee: Texas Instruments Incorporated, Dallas, TX (US)

(*) Notice: Subject to any disclaimer, the term of this patent is extended or adjusted under 35 U.S.C. 154(b) by 145 days.

(21) Appl. No.: 11/381,071

(22) Filed: May 1, 2006

(65) Prior Publication Data

US 2007/0013524 A1    Jan. 18, 2007

(30) Foreign Application Priority Data

Apr. 29, 2005  (DE) .................. 10 2005 020 054
Jun. 20, 2005  (DE) .................. 10 2005 028 396

(51) Int. Cl.
*G08B 13/14*  (2006.01)

(52) U.S. Cl. .............. 340/572.1; 340/572.4; 340/572.7; 340/572.8; 340/438; 340/442; 340/447; 340/505; 340/693.1; 257/369; 257/372; 257/398

(58) Field of Classification Search .............. 340/572.1, 340/572.4, 572.7, 572.8, 438, 442, 447, 505, 340/693, 639; 257/369, 372, 398
See application file for complete search history.

(56) References Cited

U.S. PATENT DOCUMENTS

| | | | |
|---|---|---|---|
| 6,560,082 B1 | 5/2003 | Shigeru | |
| 7,154,720 B2* | 12/2006 | Hiraga | 361/56 |
| 7,245,513 B2* | 7/2007 | Watanabe et al. | 363/108 |
| 2005/0242939 A1* | 11/2005 | Hagl et al. | 340/447 |
| 2007/0007343 A1* | 1/2007 | Ganz | 235/435 |

* cited by examiner

*Primary Examiner*—Tai T Nguyen
(74) *Attorney, Agent, or Firm*—William B. Kempler; Frederick J. Telecky, Jr.; Wade J. Brady, III

(57) ABSTRACT

A transponder device comprises an integrated CMOS circuit with a semiconductor substrate. A first rectifying diode (DS) is formed by the substrate diode of the CMOS circuit. A first MOS transistor structure (DR1) and a second MOS transistor structure (DR2) have their channels connected in series such that they function as a second rectifying diode, the cathode of the first rectifying diode being connected to the anode of the second rectifying diode. The first MOS transistor structure (DR1) and the second MOS transistor structure (DR2) are spaced from each other such that a distance between the two MOS transistor structures is large enough that a parasitic npn-structure formed within the substrate by the first and the second MOS structures has a negligible current gain.

20 Claims, 5 Drawing Sheets

TRANSPONDER DEVICE

This application claims the priority of German Applications 10 2005 020 054.0 filed Apr. 29, 2005 and 10 2005 028 396.9 filed Jun. 20, 2005.

The invention relates to a transponder device, in particular with an LC oscillator circuit, an energy storage capacitor and an integrated transponder circuit powered by energy from the storage capacitor.

BACKGROUND

The energy for operation of such a transponder in the receive and transmit modes is obtained from an interrogator transmitter, by rectifying a received interrogation RF signal. The energy is stored in a charge capacitor. In a HDX (Half Duplex) CMOS integrated transponder circuit, the inherent substrate diode (formed by any of the n-diffusion areas connected to the antenna RF terminal in conjunction with a semiconductor p-substrate), is used as a rectifier diode. With such a rectifier diode, only the negative half-wave of the received RF signal is used, and the resulting DC voltage stored in the charge capacitor is limited to the peak voltage of the RF signal.

For applications that require a relatively large range of the transponder's transmitter, a higher supply voltage is required than can be obtained with a half-wave rectifier. A voltage twice that which can be obtained with a half-wave rectifier would be obtained with a full-wave rectifier.

A full-wave rectifier would require a second rectifier diode in addition to the existing substrate diode. Incorporation of an additional diode within the substrate would require a well process with an isolated p-well area. Available CMOS processes for low-cost production of transponder devices do not have this option.

A high voltage PMOS transistor that could be connected as a diode is also not available with this technology.

A second rectifying diode could be formed by a diode-connected NMOS transistor. However, the required n-diffusions together with the p-substrate inevitably create a parasitic npn-structure that behaves as a bipolar transistor. The parasitic npn-structure destroys the reverse isolation of the rectifier diode formed by the NMOS transistor during the negative half wave when the substrate diode is conducting.

SUMMARY

The invention provides a transponder device wherein a diode-connected MOS transistor arrangement is used as a second rectifier diode and the effect of the parasitic npn-structure is negligible.

In a described embodiment, the inventive transponder device comprises an integrated CMOS circuit with a semiconductor substrate. A first rectifying diode is formed by the substrate diode of the CMOS circuit. A first MOS transistor structure and a second MOS transistor structure have their channels connected in series such that they function as a second rectifying diode. The cathode of the first rectifying diode is connected to the anode of the second rectifying diode. The first MOS transistor structure and the second MOS transistor structure are spaced from each other, such that a distance between the two MOS transistor structures is large enough that a parasitic npn-structure formed within the substrate by the first and the second MOS structures has a negligible current gain.

Splitting an NMOS transistor used for an example implementation of a second rectifier diode into separate, series-connected NMOS transistor structures and placing the separate NMOS structures at a large distance from each other within the substrate, results in a parasitic npn-structure with such a large base width, and consequently low current gain, that the parasitic effect becomes negligible.

A further embodiment provides a distance larger than 100 µm between the two MOS transistor structures.

Yet another embodiment provides a p-type substrate conductivity. As an option, each of the first and the second MOS transistor structures is an NMOS transistor.

Another embodiment shows the transponder further comprising a first terminal connected to the cathode of the first rectifying diode and the anode of the second rectifying diode. A second terminal is connected to the anode of the first rectifying diode; a third terminal is connected to the cathode of the second rectifying diode.

In addition, the transponder may comprise an LC resonant circuit connected in series with a first charge capacitor between the first terminal and the second terminal.

In another embodiment a second charge capacitor is connected across the third terminal and the second terminal.

The first rectifying diode and the second rectifying diode can be each used as a half-wave rectifier.

Another embodiment provides the transponder device as part of a transponder application.

In yet another embodiment, the transponder device is used in a vehicular tire pressure monitoring system.

In an example implementation, a vehicular tire pressure monitoring system is provided that comprises the transponder device as suggested for each tire to be monitored, the transponder device having an incorporated RF transmitter and being physically associated with the wheel/tire to be monitored. Furthermore, a pressure sensor is provided for each tire to be monitored and connected to circuitry in a corresponding transponder device. In addition, the vehicular tire pressure monitoring system comprises an interrogator unit associated with each transponder device and being physically mounted on a vehicle in proximity to a wheel whereon a tire to be monitored is mounted. Also, a central RF receiver is provided for all transponder devices, wherein each transponder device is inductively coupled with an associated interrogator unit and includes an electric charge accumulation element adapted to be charged by energy inductively supplied from the associated interrogator unit in a first mode of operation. The charge accumulation element provides a power supply to the RF transmitter of the transponder device in a second mode of operation.

The function of the interrogator units is to sequentially supply energy to the associated transponder device in the first mode of operation and to permit the transponder device in the second mode of operation to operate the RF transmitter for the transmission of data from the transponder device to the central RF receiver in the vehicle. Processing of the data may occur in an appropriate controller associated with a central receiver. Thus, the interrogator units need no data processing capability, nor need them to be wired for data transmission. Hence, evident benefits from a battery-less concept are not achieved at the expense of data processing capability in the interrogators and complex wiring.

A preferred embodiment suggests a capacitor as an accumulation element for electric energy.

Another embodiment provides the central RF receiver to be installed in the vehicle as part of a remote control system and connected to a remote control controller provided with added functionality for processing data received from the transponder device and for driving a display device in the vehicle.

In another embodiment, the interrogator units are connected to and controlled by the remote control controller.

Furthermore, the remote control system can be a remote keyless entry system.

A further embodiment is that the interrogator units are mounted in respective wheel housings of the vehicle. The charge accumulation elements, in particular capacitors, are charged during rotation of respective wheels.

In addition, the interrogator units can be mounted on a liner of plastics material and include an antenna that extends along a major part of the peripheral extension of the liner with respect to vehicle rotation.

It is also an embodiment, that the energy transmitted from the interrogator units to the transponder devices is an electromagnetic wave at a carrier frequency in the LF range.

Furthermore, the capacitor can preferably have a capacity in a range of several $\mu F$ to several tens of $\mu F$.

BRIEF DESCRIPTION OF THE DRAWINGS

Embodiments of the invention are shown and illustrated in view of the following figures.

DETAILED DESCRIPTION OF THE EMBODIMENTS

For purposes of illustration, and not by way of limitation, an example embodiment of the invention is described in the context of an application to a tire pressure measurement system (TPMS) transponder. Such a TPMS-transponder needs a supply voltage in the range of the peak-to-peak voltage of the RF antenna signal in order to achieve a high amplitude of the antenna signal during the uplink (response) phase.

Figure 1:
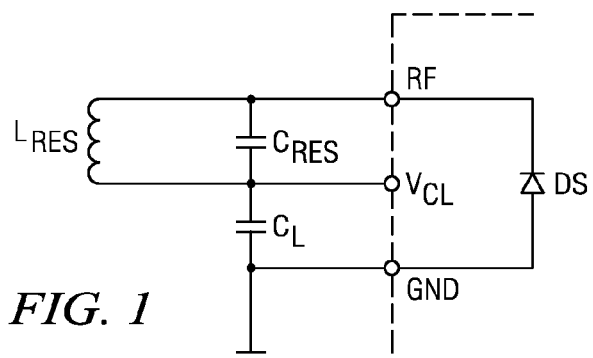
FIG. 1 shows a half-wave rectification circuit with a substrate diode.

FIG. 1 shows a half-wave rectifier in an integrated CMOS transponder circuit with a substrate diode used as a rectifier diode. An LC resonant circuit comprises a parallel connection of an inductor $L_{RES}$ and a capacitor $C_{RES}$. One side of the LC resonant circuit is connected to a terminal RF, the other side is connected to a terminal VCL. A charge capacitor $C_L$ is connected between the terminal VCL and a ground terminal GND. A substrate diode DS is further connected such that the cathode is connected to the terminal RF and the anode is connected to the ground terminal GND. With such an arrangement, only the negative half-wave of a received RF signal is used.

Figure 2:
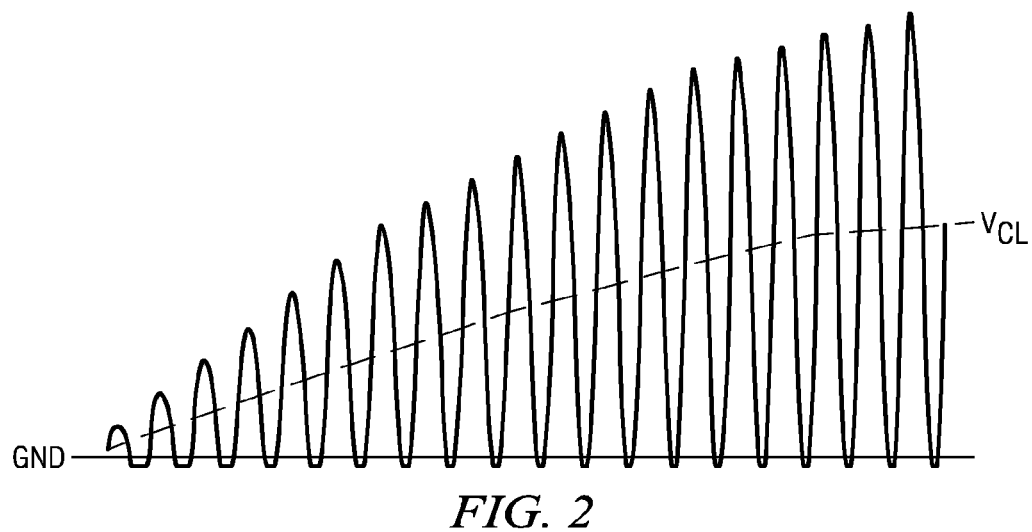
FIG. 2 shows an input voltage and an output voltage $V_{CL}$ pursuant to the circuit of FIG. 1.

FIG. 2 shows the input voltage during the charging phase of the capacitor $C_L$ and the signal at terminal VCL during the same time period.

The half-wave rectification according to FIG. 1 is done by the substrate diode DS of any n-diffusions connected to terminal RF during the negative half-wave of the antenna voltage. Hence, a supply voltage builds the center of the antenna sine wave. This applies to the downlink (reception, interrogation) phase as well as to the uplink (transmission, response) phase. When the system works in half duplex mode, the transmitter has to keep quiet during the response phase. Thus, the oscillation at the antenna voltage has to be maintained by the tag with the help of plucking. The pluck functionality needs the supply voltage to be in the center of the antenna voltage.

Figure 3:
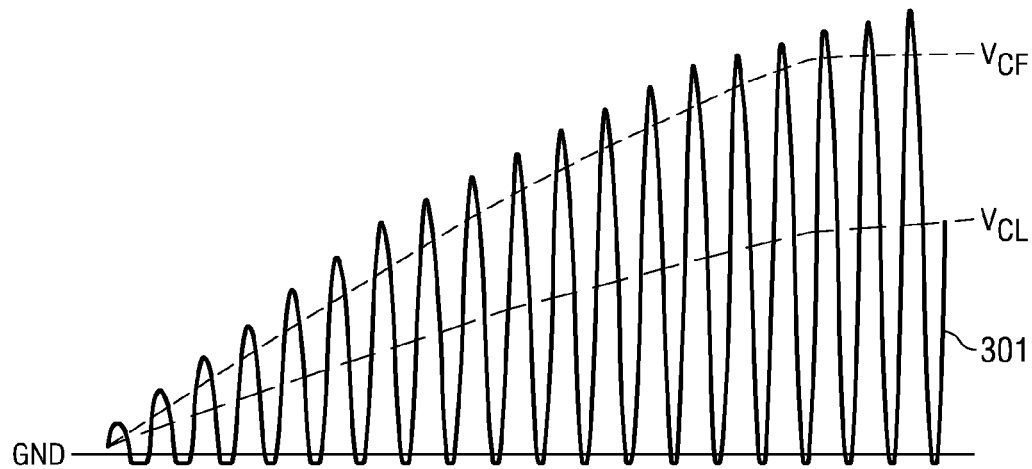
FIG. 3 shows the input voltage and the charged output voltages VCL and VCF during the charging phase.

For applications such as for tire pressure measurement (monitoring) systems, for example, an increased supply voltage would permit the desired wider range during the response (uplink) phase of the transponder. The half duplex pluck functionality requires a voltage to be substantially around the middle of the sine wave. During the uplink phase a doubled supply voltage VCF (peak-to-peak voltage) would then be switched to the single supply voltage VCL that is generated by the half-wave rectifier. Now plucking around the doubled supply voltage VCF would achieve an amplitude of the antenna voltage substantially amounting to two times of the voltage VCF (see FIG. 3, input voltage 301 during the charging period and output voltage VCL and VCF).

Figure 4:
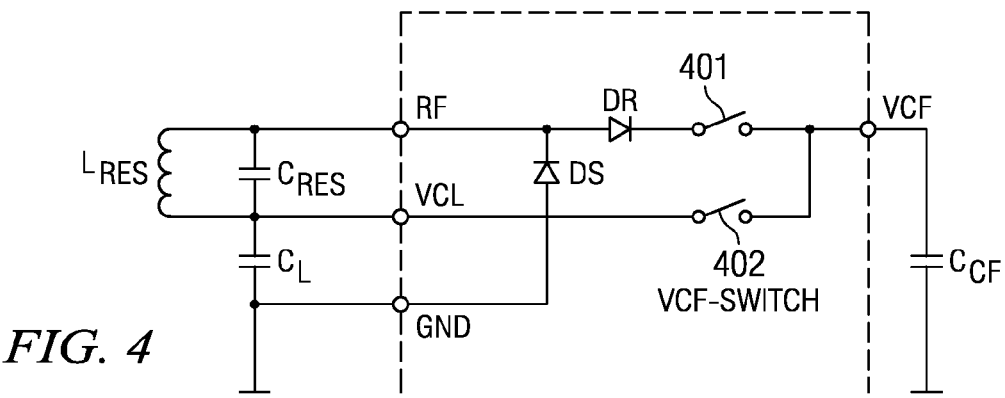
FIG. 4 shows a circuit diagram of a rectifier and a VCF-switch.

The corresponding circuit, together with a VCF-switch, is shown in FIG. 4. That circuit comprises the LC resonant circuit together with the capacitor $C_L$ according to FIG. 1. As in FIG. 1, there are terminals RF, VCL and ground GND together with the substrate diode DS connected with its cathode to the terminal RF and with its anode to the ground terminal GND. In FIG. 4, a switch 402 is connected between the terminal VCL and a terminal VCF. The terminal RF is also connected to an anode of a diode DR, the cathode of which is connected to a switch 401. The other side of said switch 401 is connected to the terminal VCF. A capacitor Ca is connected between the terminal VCF and ground GND.

Closing the VCF switch 401 doubles the supply voltage VCF which is preferably used during the uplink phase of the transponder device.

The second rectifier diode DR can he implemented as an NMOS transistor.

Figure 6:
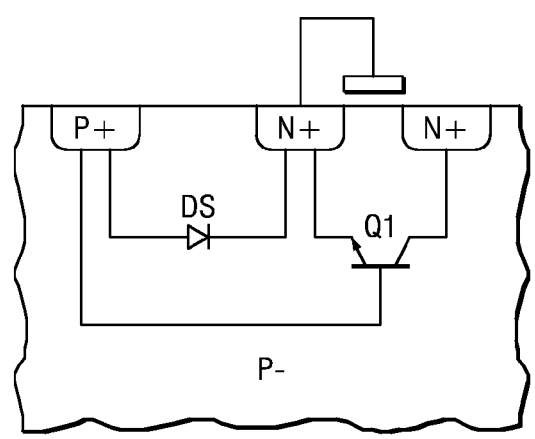
FIG. 6 shows a substrate comprising the diodes of FIG. 5 and a parasitic bipolar transistor.

As a result of this approach, a parasitic bipolar npn-transistor structure Q1 (see FIG. 6) is created inevitably. During the negative half wave, the potential at the RF-terminal is forced below the ground potential GND amounting to −0.7V (voltage drop over the diode DS). The rectification is done here by the diode DS, the parasitic transistor Q1 gets conductive because the diode DS is the base-emitter diode which is driven in forward direction. The collector of the parasitic transistor Q1 is at the terminal VCF which is charged to a high level of up to 6V, Thus, charge reflows from the terminal VCF to the terminal RF which lowers the voltage at the terminal VCF. Hence, the usage of the substrate diode DS destroys the isolating effect of the MOS diode DR.

Figure 5:
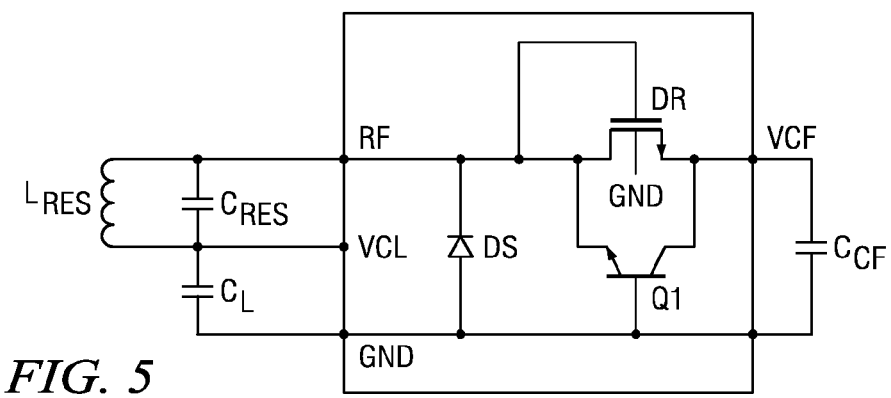
FIG. 5 shows a circuit diagram comprising two diodes DS and DR, the second diode DR realized as a MOS transistor structure.

FIG. 5 shows an equivalent circuit diagram of an implementation with a MOS transistor as described. The circuit corresponds to FIG. 4, but the diode DR is implemented by a MOS transistor. In addition, the parasitic npn-Transistor Q1 is shown.

In principle, the transistor length determines the Base width and therefore the current gain β of the parasitic transistor Q1. Hence, the parasitic effect of the transistor Q1 can be minimized by reducing its current gain β. This can be achieved by enlarging its Base.

Figure 7A:
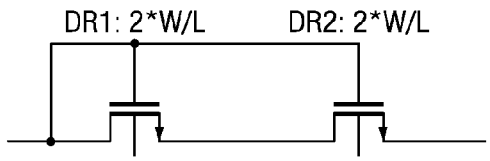
FIG. 7A shows two MOS transistor structures connected in series.
Figure 7B:
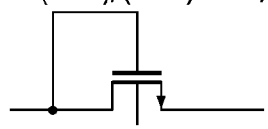
FIG. 7B shows the equivalent diagram of FIG. 7A comprising one MOS transistor structure.

Accordingly, the MOS transistor structure implementing the diode DR is divided up into two MOS transistor structures DR1 and DR2 pursuant to FIG. 7A. This permits the increase of the effective Base width of the parasitic npn-transistor Q1 by placing the MOS transistor structure DR1 and the MOS transistor structure DR2 apart from each other at spaced locations on the substrate. For example, if the distance between MOS transistor structures DR1 and DR2 amounts to 1 mm, the Base width of the parasitic transistor Q1 is increased from 2.5 μm to 1 mm. This results in a drastically reduced current gain β. FIG. 7B shows an equivalent diagram of the two MOS transistor structures according to FIG. 7A. As the MOS transistor structures DR1 and DR2 are connected in series with their Gates connected (series-connected channels), both DR1 and DR2 implemented with doubled channel width W are equivalent to the diode DR.

Figure 8:
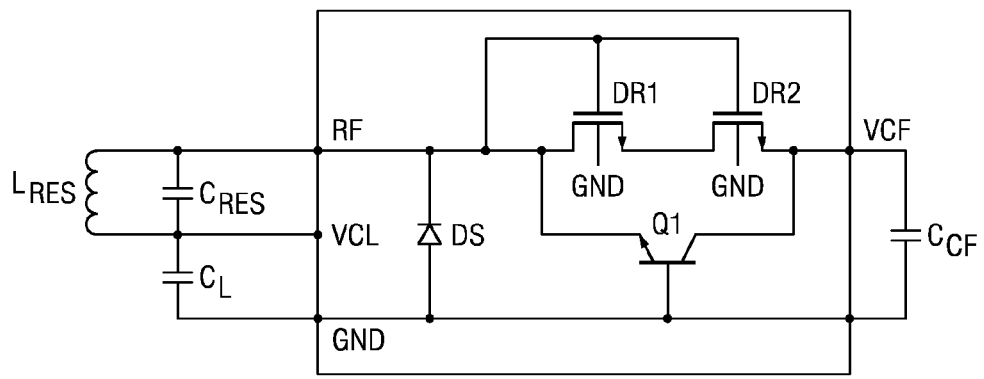
FIG. 8 shows the circuit diagram pursuant to FIG. 5, comprising two MOS transistor structures working as a diode DR.

FIG. 8 shows a circuit comprising the transponder-IC with two separate MOS transistor structures DR1 and DR2, wherein both Gates of the structures are connected together and to the Drain of the MOS transistor structure DR1, the Source of the MOS transistor structure DR1 is connected to the Drain of the MOS transistor structure DR1 and to the Source of the MOS transistor structure DR2 which is further connected to the capacitor $C_{CF}$ at the terminal VCF. The parasitic transistor Q1 is located between the Drain of the MOS transistor structure DR1 and the Source of the MOS transistor structure DR2.

Figure 9:
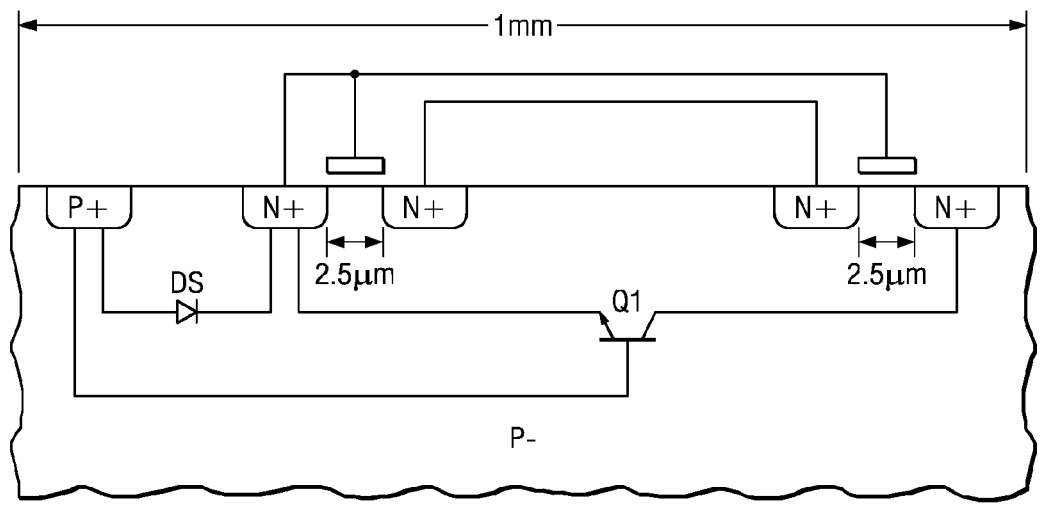
FIG. 9 shows a substrate comprising the (functional) diodes of FIG. 8 and the parasitic bipolar transistor.

The illustrative proportions of a physical implementation of the circuit diagram of FIG. 8 are shown in FIG. 9. The figure shows a substrate and different dopings comprising both MOS transistor structures DR1 and DR2, the diode DS and the parasitic transistor Q1.

In FIG. 9 the substrate is of a P− type doping, the ground diffusion is of P+ type, the two MOS transistor structures are NMOS transistor structures each comprising two N+ type dopings. The Source and Drain terminals are spaced 2.5 μm from each other within each NMOS transistor structure. Separating the MOS transistor structure DR1 from the MOS transistor structure DR2 by a distance of about 1 mm leads to a dimension of the Base width of the parasitic transistor Q1 such that the current gain β of the parasitic transistor Q1 is drastically decreased and the detrimental effect of this transistor Q1 is negligible.

Figure 10:
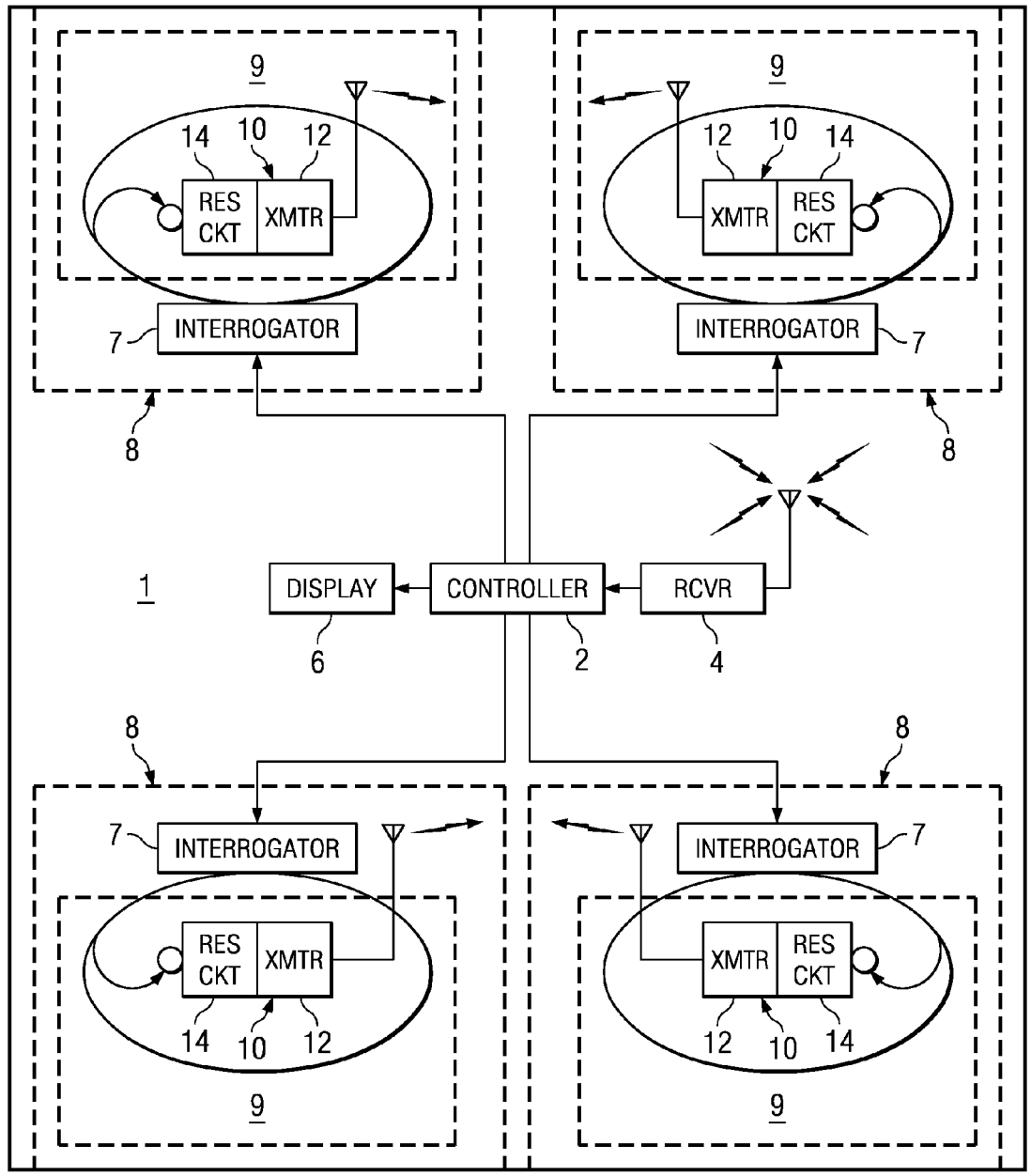
FIG. 10 shows a block diagram of a vehicular tire pressure monitoring system.

The block diagram of FIG. 10 shows a complete monitoring system in a vehicle 1, with central parts in the vehicle body. Vehicle 1 is equipped with a remote keyless entry system of which a controller 2 and a central RF receiver 4 are shown. Controller 2 and RF receiver 4 are also used in the vehicular tire pressure monitoring system. The controller 2 receives an input from the central RF receiver 4. Controller 2 outputs to a display device 6 and to four interrogator units 7 mounted in four wheel housings 8 associated with four wheels 9 to be monitored.

Interrogator units 7 are preferably mounted behind or integrated in a plastic protector against mud or on a liner of plastics material. In each wheel 9 is the transponder device 10 which is physically associated with a respective tire. Transponder devices 10 are mounted preferably at the rim of a wheel and are therefore reusable after tire changes. Each transponder device 10 incorporates an RF transmitter 12 with an associated antenna and an LF resonant circuit 14 which is inductively coupled to a respective interrogator unit 7. Each interrogator 7 is connected to the central controller 2 either via a two-wire connection or via a bus system. Interrogator units 7 are used to provide power to the transponder devices 10 and may also send commands and data to the transponder devices. This tire pressure monitoring system is a sequential system. In a first mode of operation, power is supplied from interrogator units 7 to the transponder devices via inductive coupling and in a second mode of operation; interrogator units 7 drive their RF transmitter 12 to transmit measurement data to the central RF receiver 4.

Figure 11:
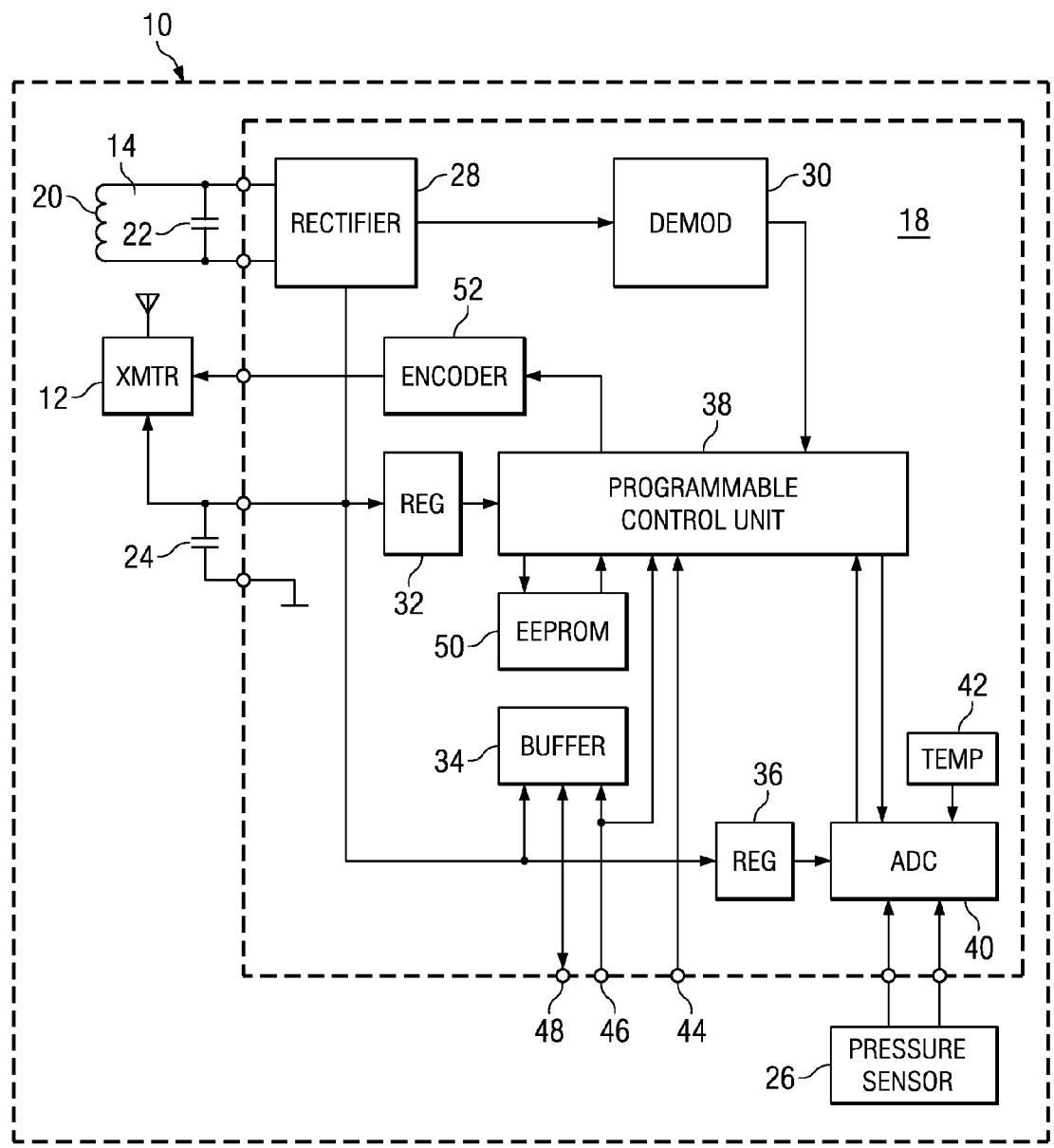
FIG. 11 shows in a block diagram the part of the monitoring system which is mounted on a vehicle wheel.

With reference to FIG. 11, the function of the transponder devices will be explained in greater detail. FIG. 11 shows one transponder device 10 of FIG. 10 in more detail. A block 18 with dashed lines limits the part of transponder device 10 which is integrated on an integrated circuit. Connected to this integrated circuit 18 are the RF transmitter 12, the LF resonant circuit 14, a charge accumulation capacitor 24 and a pressure sensor 26.

RF transmitter 12 is coupled to an output terminal. LF resonant circuit 14 which is formed by an inductor antenna 20 and a capacitor 22 is connected to LF input terminals of the integrated circuit 18. Capacitor 24 is connected to power terminals and is charged to provide energy to RF transmitter 12 and to the measurement circuitry. Pressure sensor 26 which measures the tire pressure is connected to analog input terminals.

The integrated circuit 18 itself contains circuitry for processing of the measurement data, for detecting a request from the interrogator units 7 and for control of the voltage supply.

The energy received by resonant circuit 14 is rectified in a rectifier block 28 on integrated circuit 18 which is connected to the resonant circuit 14 via the LF input terminals. Rectifier block 28 outputs a rectified voltage to a voltage regulator 32 as well as to the external capacitor 24 via the power terminals.

It should be understood that the rectifier block 28 is a full wave rectifier as described above so that capacitor 24 is charged to the peak-to-peak voltage of the RF signal received at the LF resonant circuit 14.

Supply voltage from capacitor 24 is also delivered to a data buffer 34 and to another voltage regulator 36. Rectifier block 28 also passes the signal received at its input to an output which is connected to an input of a demodulator 30. A main component of integrated circuit 18 is a programmable control unit 38 which receives its voltage supply from voltage regulator 32. Programmable control unit 38 controls measurement of data and processes the measurement data. Demodulator 30 receives an interrogator signal from interrogator unit 7 via rectifier block 28. After demodulation demodulator 30 outputs an initiation signal to programmable control unit 38. Programmable control unit 38 has an output connected to an input of an analog digital converter 40 which has two other inputs connected to the pressure sensor 26 via the analog input terminals. A temperature sensor 42 which is integrated on the integrated circuit 18 has an output connected to a further input of analog digital converter 40. Analog digital converter 40 outputs the converted measurement data to an input of programmable control unit 38. Programmable control unit 38 receives a clock via a clock terminal 44. Via an enable terminal 46 programmable control unit 38 can be enabled. This enable terminal is also connected to the data buffer 34. Program data can be loaded to programmable control unit 38 from a data input terminal 48 via the data buffer 34; an EEPROM 50 is also provided and connected to programmable control unit 38. EEPROM 50 and data buffer 34 are used to load program data to programmable control unit 38 and for adapting, e.g., the sensor curve to the actually used pressure sensor. Programmable control unit 38 has an output connected to an input of an encoder 52. After processing of the measurement data, programmable control unit 38 outputs the data to be sent to encoder 52. Encoder 52 has an output connected to an input of RF transmitter 12 via an output terminal of integrated circuit 18. Encoder 52 encodes the data and outputs the encoded data to RF transmitter 12. The code to be used can be a Manchester Code.

In a first mode of operation which can last several seconds, capacitor 24 is charged. Interrogator unit 7 includes an LF transmitter which operates at an LF frequency of 125 kHz or 134.2 kHz. The LF transmitter sends an electromagnetic wave with the LF frequency. Resonant circuit 14 is tuned to this LF frequency and receives energy each time transponder device 10, which turns with the wheel, passes in front of interrogator unit 7 which is mounted in wheel housing 8. The energy received by resonant circuit 14 and rectified by the rectifier in rectifier block 28 is then stored in capacitor 24. For permitting effective energy transfer, interrogator units 7 each include an antenna that extends along a major part of the peripheral extension of a liner of plastic material with respect to vehicle rotation.

Capacitor 24 has a capacity in a range of several F to several tens of μF to allow sufficient storage of energy.

In a second mode of operation, interrogator unit 7 sends a request for the transmission of measurement data. During this mode of operation which lasts only several milliseconds, energy is supplied from capacitor 24 to RF transmitter 12.

The measurement request is demodulated by demodulator unit 30 and output to programmable control unit 38. Programmable control unit 38 then takes temperature and pressure measurement data from analog digital converter 40. The obtained measurement data is processed in programmable control unit 38 and sent to encoder 52. Encoder 52 encodes the received data and outputs them via the output terminal to RF transmitter 12 which sends a response telegram. Presuming a telegram length of 64 bits at a bitrate of 9.6 kbits/s, transmission of the measurement data to central receiver 4 lasts only several milliseconds. When the response telegram with the measurement data has been sent by RF transmitter 12, the second mode of operation ends and the first mode of operation is resumed.

As an alternative to the interrogator 7 sending a request to the transponder device 10 at the end of a charging period, the transponder device 10 may detect a full charge of capacitor 24 and switch to the transmit mode when a predetermined charge voltage is reached.

The LF transmitter in each interrogator 7 may operate continuously. As a further alternative, the LF transmitters operate discontinuously, and termination of each LF transmission period is detected by the associated transponder devices to cause automatic switching to the data transmit mode.

The invention claimed is:

1. A transponder device comprising:
   an integrated CMOS circuit in a semiconductor substrate forming circuitry of the trandsponder device;
   a first rectifying diode formed by a substrate diode of the CMOS circuit;
   a first MOS transistor structure and a second MOS transistor structure, having their channels connected in series such that they function as a second rectifying diode, a cathode of the first rectifying diode being connected to an anode of the second rectifying diode;
   wherein the first MOS transistor structure and the second MOS transistor structure are spaced from each other such that a distance between the two MOS transistor structures is large enough that a parasitic npn-structure formed within the substrate by the first and the second MOS transistor structures has a negligible current gain.

2. The transponder device according to claim 1, wherein the substrate's conductivity is of p-type.

3. The transponder device according to claim 1, in which each of the first and second MOS transistor structures is a NMOS transistor.

4. The transponder device according to claim 1, further comprising:
   a first terminal connected to the cathode of the first rectifying diode and an anode of the second rectifying diode;
   a second terminal connected to an anode of the first rectifying diode;
   a third terminal connected to the cathode of the second rectifying diode.

5. The transponder device according to claim 4, wherein an LC resonant circuit is connected in series with a first charge capacitor between the first terminal and the second terminal.

6. The transponder device according to claim 4, wherein a second charge capacitor is connected across the third terminal and the second terminal.

7. The transponder device according to claim 1, wherein the first rectifying diode and the second rectifying diode are each used as a half-wave rectifier.

8. The transponder device according to claim 1, used in a transponder application.

9. The transponder device according to claim 1, used in a vehicular tire pressure monitoring system.

10. A vehicular tire pressure monitoring system comprising:
   a transponder device according to claim 1 for each tire to be monitored, the transponder device having an incorporated RF transmitter and being physically associated with the wheel/tire to be monitored,
   a pressure sensor for each tire to be monitored and connected to circuitry in a corresponding transponder device;
   an interrogator unit associated with each transponder device and physically mounted on a vehicle in proximity to a wheel whereon a tire to be monitored is mounted, and
   a central RF receiver for all transponder devices;
   wherein each transponder device is inductively coupled with an associated interrogator unit and includes an electric charge accumulation element adapted to be charged by energy inductively supplied from the associated interrogator unit in a first mode of operation, and the charge accumulation element providing a power supply to the RF transmitter of the transponder device in a second mode of operation.

11. The monitoring system according to claim 10, wherein the electric charge accumulation element is a capacitor.

12. The monitoring system according to claim 10, wherein the central RF receiver is one installed in the vehicle as part of a remote control system and connected to a remote control controller provided with added functionality for processing data received from the transponder devices (10) and for driving a display device in the vehicle.

13. The monitoring system according to claim 12, wherein the interrogator units are also connected to, and controlled by, the remote control controller.

14. The monitoring system according to claim 12, wherein the remote control system is a remote keyless entry system.

15. The monitoring system according to any of claim 10, wherein the interrogator units are mounted in respective wheel housings of the vehicle and the charge accumulation elements are charged during rotation of respective wheels.

16. The monitoring system according to claim 15, wherein the interrogator units are mounted on a liner of plastics material and include an antenna that extends along a major part of the peripheral extension of the liner with respect to vehicle rotation.

17. The monitoring system according to claim 10, wherein the energy transmitted from the interrogator units to the transponder devices is an electromagnetic wave at a carrier frequency in the LF range.

18. The monitoring system according to claim 11, wherein the capacitor has a capacity in a range of several µF to several tens of µF.

19. A transponder device comprising:
   an integrated CMOS circuit in a semiconductor substrate forming circuitry of the trandsponder device;
   a first rectifying diode formed by a substrate diode of the CMOS circuit;
   a first MOS transistor structure and a second MOS transistor structure, having their channels connected in series such that they function as a second rectifying diode, a cathode of the first rectifying diode being connected to an anode of the second rectifying diode;
      wherein the first MOS transistor structure and the second MOS transistor structure are spaced from each other by a distance larger than 100 µm.

20. A transponder device according to claim 19 applied in a vehicular tire pressure monitoring system, comprising:
   a transponder device according to claim 19 for each tire to be monitored, the transponder device having an incorporated RF transmitter and being physically associated with the wheel/tire to be monitored,
   a pressure sensor for each tire to be monitored and connected to circuitry in a corresponding transponder device;
   an interrogator unit associated with each transponder device and physically mounted on a vehicle in proximity to a wheel whereon a tire to be monitored is mounted, and
   a central RF receiver for all transponder devices;
wherein each transponder device is inductively coupled with an associated interrogator unit and includes an electric charge accumulation element adapted to be charged by energy inductively supplied from the associated interrogator unit in a first mode of operation, and the charge accumulation element providing a power supply to the RF transmitter of the transponder device in a second mode of operation.

* * * * *